US008484179B2

(12) United States Patent
Tran et al.

(10) Patent No.: US 8,484,179 B2
(45) Date of Patent: Jul. 9, 2013

(54) ON-DEMAND SEARCH RESULT DETAILS

(75) Inventors: Anthony Tran, Bothell, WA (US); Mira Lane, Redmond, WA (US); Eric Michael Schurman, Seattle, WA (US); Kemp Crockett Peterson, Seattle, WA (US); Jamie Paul Buckley, Redmond, WA (US); Richard Leigh Mains, Seattle, WA (US); Evan Nicklas Wu Malahy, Seattle, WA (US); Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 12/330,253

(22) Filed: Dec. 8, 2008

(65) Prior Publication Data

US 2010/0145934 A1    Jun. 10, 2010

(51) Int. Cl.
*G06F 17/30*      (2006.01)

(52) U.S. Cl.
USPC ............ 707/706; 707/721; 707/768; 707/784

(58) Field of Classification Search
USPC .......................... 707/706, 721, 784, 768, 724
See application file for complete search history.

(56) References Cited

U.S. PATENT DOCUMENTS

| | | | |
|---|---|---|---|
| 7,174,329 | B2 | 2/2007 | Silverbrook |
| 2001/0009016 | A1* | 7/2001 | Hofmann et al. ............ 709/219 |
| 2006/0122968 | A1 | 6/2006 | Naam |
| 2006/0161542 | A1 | 7/2006 | Cucerzan et al. |
| 2006/0224951 | A1* | 10/2006 | Burke et al. ................. 715/513 |
| 2007/0038608 | A1 | 2/2007 | Chen |
| 2007/0198500 | A1* | 8/2007 | Lucovsky et al. ............ 707/4 |
| 2007/0250500 | A1 | 10/2007 | Ismalon |
| 2008/0086688 | A1* | 4/2008 | Chandratillake et al. ..... 715/719 |
| 2008/0294603 | A1* | 11/2008 | Ranjan et al. ............... 707/3 |
| 2009/0043813 | A1* | 2/2009 | Moore et al. ............... 707/104.1 |
| 2009/0150784 | A1 | 6/2009 | Denney et al. ............... 715/722 |
| 2009/0171813 | A1* | 7/2009 | Byrne et al. ................. 707/5 |
| 2009/0187558 | A1 | 7/2009 | McDonald .................. 707/5 |
| 2009/0327228 | A1* | 12/2009 | Krause et al. ............... 707/3 |
| 2010/0036733 | A1* | 2/2010 | Chan et al. ................. 705/14.54 |
| 2010/0306249 | A1* | 12/2010 | Hill et al. ................... 707/769 |

OTHER PUBLICATIONS

"Web Promotion", Aug. 27, 2008. http://www.eddie-studios.com/what_influences_success.html.

(Continued)

*Primary Examiner* — Wilson Lee
*Assistant Examiner* — Tiffany Thuy Bui
(74) *Attorney, Agent, or Firm* — Shook, Hardy & Bacon L.L.P.

(57) ABSTRACT

Search results and associated search-result details are provided in response to user queries. Embodiments include identifying a number of search-result details for different indexed search results, identifying one or more detail-attributes for each search-result detail, and identifying one or more user-attributes for a particular user. These search results, associated search-result details, and associated detail-attributes may be stored in a database. Upon receiving a search query from the user, search results may be generated. Search-result details specific to each search result and specific to the end-user may also be generated by identifying the detail-attributes associated with each search-result detail and the user-attributes associated with the end-user. These search results may then be presented to the end-user. Upon receiving an indication of interest in a particular search result, the search result details may then be presented to the end user.

14 Claims, 7 Drawing Sheets

OTHER PUBLICATIONS

"On Page Optimisation", Aug. 27, 2008. http://www.phoenixrealm.com/on-page-optimisation.

"Google Book Search: Document Understanding on a Massive Scale", Aug. 27, 2008. p. 1-5. http://www.icdar2007.org/ICDAR2007_KeyNote_LVincent.pdf.

Dirk Lewandowski. "The Retrieval Effectiveness of Web Search Engines: Considering Result Descriptions", Aug. 27, 2008. p. 1-19. University of Applied Sciences, Hamburg, Germany. http://eprints.rclis.org/archive/00012971/01/JDoc2008_PrePrint.pdf.

Aidan Hogan, et al. "Towards a Scalable Search and Query Engine for the Web", Aug. 27, 2008. p. 1-4. National University of Ireland, Galway. Galway, Ireland. http://www2007.org/htmlposters/poster1027.

* cited by examiner

ON-DEMAND SEARCH RESULT DETAILS

BACKGROUND

Displaying information related to the search results of a performed search is an important feature of search engines. For example, information displayed as part of a web search result may inform a user of what may be found at the web page linked to by the web search result. For instance, a search engine may present a number of search results, each search result linking to a web page. An excerpt from the linked-to web page may be displayed as part of the search result. This excerpt can inform the end-user about the content of the web page that is linked-to. One aspect of displaying this information is how to determine how much information to display along with a search result: if not enough information is displayed, a user may not be able to judge properly whether a search result link could provide useful information; if too much information is displayed, the user may become frustrated with the level of detail. Another aspect of displaying too much information is that the number of search results that may fit on a viewing screen is finite: if too much information is displayed along with each search result, only a small number of search results and search-result related information may be displayed on screen at a time.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to presenting additional search result information to an end-user of a search engine. In accordance with embodiments of the present invention, an end-user may interact with a search engine to search a number of indexed documents. For example, a search request may be made to a search engine and, in response, a number of search results may be provided to the end-user. Some of these returned search results may have additional details associated with them, some of which may be relevant to the end-user. Examples of such additional details may be found within the indexed documents and may include a particular paragraph of the indexed document, specific media files found within or linked-to from the indexed document, location information, phone number information, related web-pages linked to from the indexed document, related web-pages that link to the indexed document, etc. If the user indicates interest in a particular search result, for instance, by hovering over a search result or clicking an area related to the search-result, some of these additional details may be displayed in an attractive and appropriate manner. Further, embodiments of the present invention may allow each end-user of the search engine to be associated with a number of user-attributes. The search-result details displayed may thus be tailored to the specific user-attributes, such that a second user may be presented with different search result details than would be presented to a first user, even though the second user may seek details of the same search result as the first user.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a method for providing search results and related search-result details to an end-user of a search engine. The method allows an end-user to be provided with search results, as well as search result details if the end-user indicates a desire to see such search-result details. These search result details provide additional information than that provided by the search result. These search-result details may also be tailored specifically to a particular end-user, such that the search result details may conform closely to what that particular end-user would find useful.

Various search result details may be presented to the end-user. For example, a web page may contain a certain paragraph that relates to what that particular end-user has searched for. Upon receiving an indication of interest, the search engine may provide the end-user with that certain paragraph. In another example, in a first search the end-user may have searched for a particular product, such as soap. Upon receiving a second search request from the same user, perhaps a search request for retail stores in the user's area for example, the search engine may generate search results including a number of retail stores in the user's area along with product details for each retail store, such as the price of soap at each retail store. The end-user may then be presented with the returned search results, along with a clickable area near each of the search results. Upon clicking on this clickable area, the end-user may be presented with the product details from the linked-to web page, such as the price of soap at that particular retail store. In another example in accordance with the present invention, a web page may contain media files. The search engine may have gathered from the end-user's previous behavior or indications that this particular end-user finds media files relating to certain sporting events particularly interesting. Upon receiving a search query, the search engine may generate search results and present the end-user with search results. Some of these search results may link to a web page that contains media files relating to the certain sporting events that the end-user may find interesting. Upon receiving an indication of interest from the end-user in a particular search result, the search engine may provide the end-user with the media file from the web page in a pop-up.

One aspect of embodiments in accordance with the present invention is the manner in which the search-result details may be presented to an end-user. Displaying search result details with every search result may be burdensome, unattractive or inappropriate to the end-user because of the amount of screen space that may be necessary to present all search results and associated search result details. In embodiments of the present invention, it is possible to save screen space and maintain an attractive and appropriate interface for the end-user by waiting until an indication of interest is received from the end-user before presenting search result details. For example, a number of search results may be initially presented to the end-user. Some search result details may be presented, and other search result details may be generated but not presented as aesthetic, technical and other limitations dictate. For instance, search-result details may be presented in a slide-out, popup, or in a manner most suited to efficiently convey the information to the user in accordance with reading patterns and information consumption.

Thus, search-result details may thus be presented not only more attractively, but also in a manner that is tailored to a user's cognitive load and capacity to process data. The end-user may then indicate his or her interest in a particular search result. This indication of interest may be the end-user hovering over a search result, clicking on an area associated with a search result, right-clicking on a search result, highlighting a search result or search result associated area, etc. It will be appreciated by one of ordinary skill in the art that many other indicators of interest would be of possible use in embodiments in accordance with the present invention, including indicators of interest generated from the end-user interacting with a computer mouse, keyboard, touch screen, trackball, joystick, remote control, or any number of input devices. Upon receiving the indication of interest, the end-user may be presented with a slide-out or pop-up containing one or more additional search result details as may be determined to be appropriate. It will be appreciated by one of ordinary skill in the art that there are a number of ways in which additional search result details may be presented to the end-user, including but not limited to: pop-ups, slide-outs, expandable lists, transparent or semi-transparent image overlays, additional displayable areas on the display page, audible signals, tactile cues such as vibrations or Braille readers, etc.

It should also be noted that the indication of interest may be utilized to determine how to present the search-result details to the user. For example, the user may click on a search-result detail associated area. This clicking behavior may indicate that there is a higher, direct level of user interest in this search-result detail; the user may be presented with a popup window displaying several search-result details in response. Or, alternatively, the user may simply hover over a search result. This may indicate a lower, indirect level of user interest in this search-result detail; a small slide-out may be presented to the user conveying only one very pertinent search-result detail in response. It should also be noted that user-attributes may also be utilized, either alone or in combination with the type of indication of interest, to determine the manner of presentation of search-result details. For instance, the user may have as an associated search-result detail that he or she is using a mobile phone to interact with the search engine. This user-attribute may be utilized to determine to present search-result details as a transparent popup or other manner appropriate to a mobile device. Or, alternatively, it may be determine that the user is connected to the internet via a high-bandwidth connection. This information may be used to determine that search-result details may be provided to the user asynchronously, such as by AJAX or similar technologies. It will be appreciated by one of ordinary skill in the art that there are a number of techniques in accordance with the present invention, utilizing the type of indication of interest, user attributes, or both to determine the appropriate way in which to display search-result details to the user.

Another aspect of embodiments in accordance with the present invention is that not all search results may have associated additional search result details. A user of the search engine may be notified that additional search result details may be obtained for a particular search result but not for another. It will be appreciated by one of ordinary skill in the art that there are a number of ways in accordance with the present invention to notify the user of the search engine that he or she may obtain additional search result details for a particular search result, including but not limited to: visual cues (different colored search result links, additional clickable areas near the search result, etc), audible cues, tactile cues, etc. In addition, one search result may have an image file as an associated search-result detail, while another search result may have a music file as an associated search-result detail. It will be appreciated by one of ordinary skill in the art that the presence of these different search-result details may be indicated to the user by a number of manners, such as an icon next to each search result indicating what type of search-result detail may be obtained, etc.

Yet another aspect of embodiments in accordance with the present invention is how user-attributes may be gathered. A user may, for example, respond to a questionnaire detailing his or her profile—for example by supplying his or her gender, age, interests, hobbies, occupation, location, phone number, etc. In another example, information related to user-behavior may be automatically gathered as the user interacts with the search engine to generate user-attributes—for example by storing information relating to past user-behavior such as: topics searched, search results recently clicked, the location of the user's IP address, the amount of time the user spends on the search engine, the time of day that a user typically conducts searches, etc. User-attributes may even be generated by a user's interaction with search-result details. For example, if a user indicates interest in a certain search-result, and certain search-result details are displayed in response, this behavior may be utilized later as a user-attribute. A user may even then go on to interact with one or more of the displayed search-result details, for example, by hovering over or clicking on a media file presented as a search-result detail. This information may also be utilized later as a user-attribute in accordance with embodiments in accordance with the present invention. It will be appreciated by one of ordinary skill in the art that any number of user-behaviors or user-inputs could be utilized as a user-attribute in accordance with embodiments of the present invention.

Accordingly, in one embodiment, an aspect of the present invention is directed to a computer-implemented method for providing search results and associated search-result details to a user. The method includes receiving a search query from a user. The user may be associated with one or more user-attributes. The method also includes generating a plurality of search results in response to a search query, and generating search-result details for at least some of the search results. These search-result details may be generated based on the user-attributes for that particular user. The method further includes providing a portion of the plurality of search results for presentation to the user. The method also includes receiving from the user an indication of interest, the indication of interest being associated with the at least one of the search results. Still further the method includes providing the search-result details for presentation to the user in response to the received indication of interest.

In another aspect, an embodiment of the invention is directed to one or more computer-storage media storing computer-useable instructions for causing a computing device to perform a method for providing search-result details to a user. The method includes storing a number of search results in a database. The method also includes storing a number of search-result details in a database. Each of these search-result details may be associated with at least one search result, and may also be associated with at least one detail-attribute. In addition, the at least one search result may be associated with at least two of these search-result details. The method also includes receiving a search query from a user. This user may be associated with one or more user-attributes. The method further includes identifying a portion of the number of search results based on the search query. This portion may include the at least one search result associated with the at least two of the search-result details. The method also includes identifying the at least two of the search-result details that are associated with the particular search result. The method still further includes identifying at least one search-result detail based on comparing the detail-attributes of each of the search-result details with the user-attributes. The method still further includes communicating the at least one search result to the user, and communicating the search-result detail that has been previously identified to the user. The method also includes receiving a first indication of interest from the user. This first indication of interest may be associated with one of the search results presented to the user. The method still further includes facilitating the presentation of the search-detail identified as appropriate to the user in response to the received first indication of interest.

A further aspect of the invention is directed to one or more computer-storage media storing computer-useable instructions for causing a computing device to perform a method for providing search results and associated search-result details to a first user. The method includes storing a search result in a database. The method also includes analyzing a computer document associated with the search result to identify at least one search-result detail. The method further includes storing the at least one search-result detail in a database. The method also includes receiving a search query from the first user. The method further includes identifying the search result and the at least one search-result detail based on the search query. The method still further includes communicating the search result for presentation to the first user. The method also includes receiving an indication of interest from the first user. This indication of interest may be associated with the search result. The method still further includes providing the at least one search-result detail for presentation to the first user.

Figure 1:
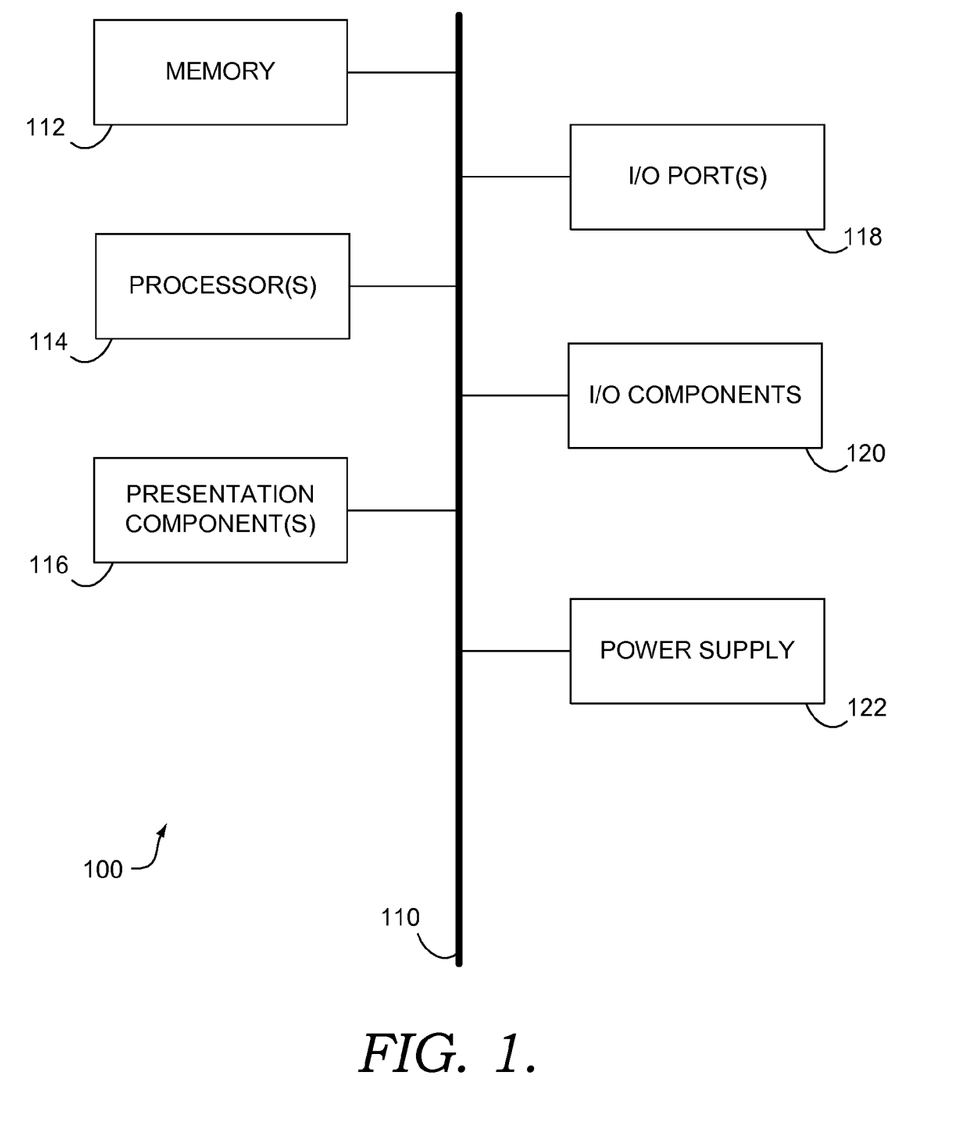
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
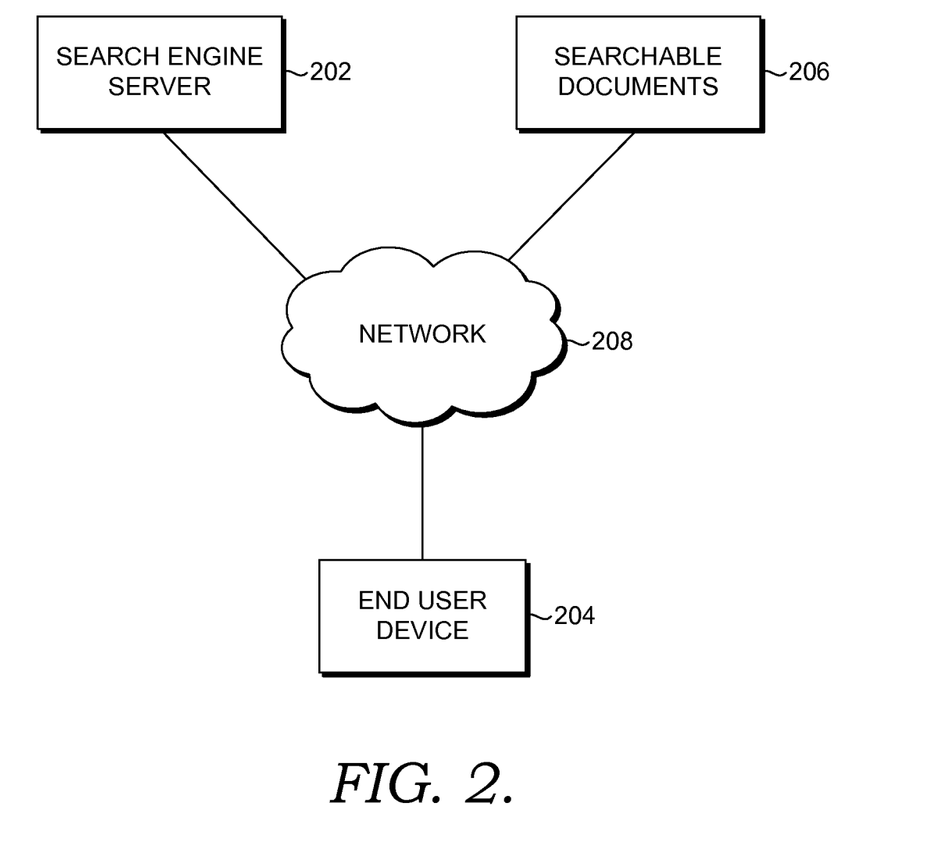
FIG. 2 is a block diagram of an exemplary system in which embodiments of the present invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 may include a search engine server 202, an end-user device 204, and a number of searchable documents 206. Each of the search engine server 202, end-user device 204, and searchable documents 206 may include any type of computing device, such as computing device 100 described with reference to FIG. 1, for example. The components communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of search engine servers, end-user devices, search engine devices, searchable documents, and networks may be employed within the system 200 within the scope of the present invention. Each may comprise a single device or multiple devices in a distributed environment. Additionally, other components not shown may also be included within the system 200.

The system 200 illustrates an internet search engine environment in accordance with one embodiment of the present invention. Generally, the search engine server 202 provides an interface for end-users with which to search a number of searchable documents 206. The search engine server 202 examines a number of the searchable documents 206 and indexes information and details gathered related to the documents for later use. An end-user may employ an end-user device, such as the end-user device 204, to access the search engine server 202 to conduct a search. This end-user device 204 may be a computer, a cellular phone, or any device capable of being connected to the system. The search engine server 202 may then return search results to the end-user device 204. The end-user may utilize the end-user device 204 to then generate a indication of interest in one of the search results, and the search engine server 202 may then provide to the end-user device 204 a search-result detail or search-result details.

For example, the search engine server 202 may connect to a searchable document 206 over the network 208. The search engine server 202 may examine the searchable document 206 to determine if the document contains search-result details. The search engine server 202 may store one or more of these search result details, along with other characteristics of the searchable document 206. Thus, the search engine server 202 may store the searchable document's size, content, content-type, number of links from that searchable document to other searchable documents, the physical server location of the searchable document, physical locations referenced by the document, media files contained within or referenced to by the document 206, etc. The search-engine server may also associate the gathered search-result details with detail-attributes. For example, if "Iceland" is found within a searchable document 206, the search engine server 202 may store in a database "Iceland" as a search-result detail for that document, and then also associate with that search-result detail a detail-attribute noting that the search-result detail is a "Country." The search engine server 202 may then store these search-result details, detail-attributes, and other information for later retrieval.

After this result has been stored, an end-user may use a computer as an end-user device 204. The end-user may connect the end-user device 204 to the network 208 in order to access the search engine server 202. The end-user may send the search engine server 202 a search query. In response to this search query, the search engine server 202 may determine that the searchable document 206 it had previously indexed is related to the search query sent by the end-user. The search engine server 202 may then provide the searchable document 206, or a reference thereto, as a search result to the end-user device 204. The end-user may then observe this searchable document 206, or reference thereto, on his or her end-user device 204. The end-user may wish to see additional search-result details related to the search result, and may interact with the search result to send an indication of interest to the search engine server 202. The end-user may, for example, hover over the search result, click the search result, right-click the search result, click an area associated with the search result, etc, to generate an indication of interest. The search engine server 202 may receive this indication of interest, and, in response thereto, provide the user with one or more search-result details previously gathered. These search-result details may be displayed on the end-user device in a pop-up window, a new window, a slide-out box, etc.

Figure 3A:
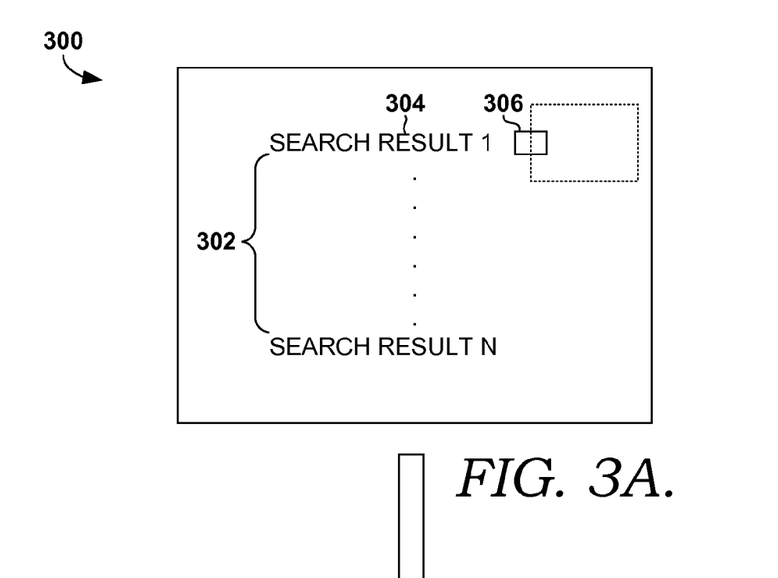
FIG. 3A is a screen display showing an embodiment of the present invention.
Figure 3B:
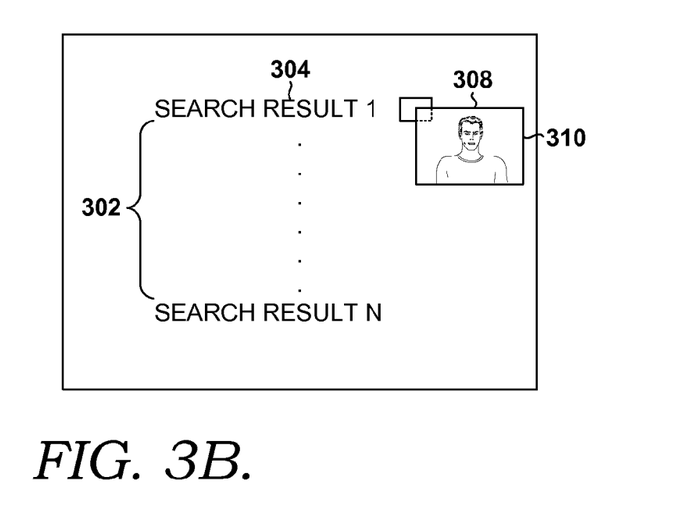
FIG. 3B is another screen display showing an embodiment of the present invention.

Referring now to FIG. 3A, a diagram is provided illustrating an exemplary screen display showing an embodiment of the present invention. The specific group of search results produced 302 includes a search result 304. Search result 304 includes a clickable area 306 that, when clicked, will cause the display of a popup area 308, as shown in FIG. 3B. Included within this popup area is a search result detail 310.

For example, a user, after sending a search query to a search engine server, may be presented with a screen resembling the screen depicted in FIG. 3A. The user can view the search results 302. The user may be particularly interested in search result 304, and may wish to be provided with additional information relating thereto. The user bay hover over the search result 304. This hovering behavior may generate an indication of interest that is sent to the search engine, which may, in response, provide the user with one or more search-result details, such as search result detail 310 shown in FIG. 3B. This search-result detail may be presented in a popup box, such as 308, also shown in FIG. 3B.

Figure 4:
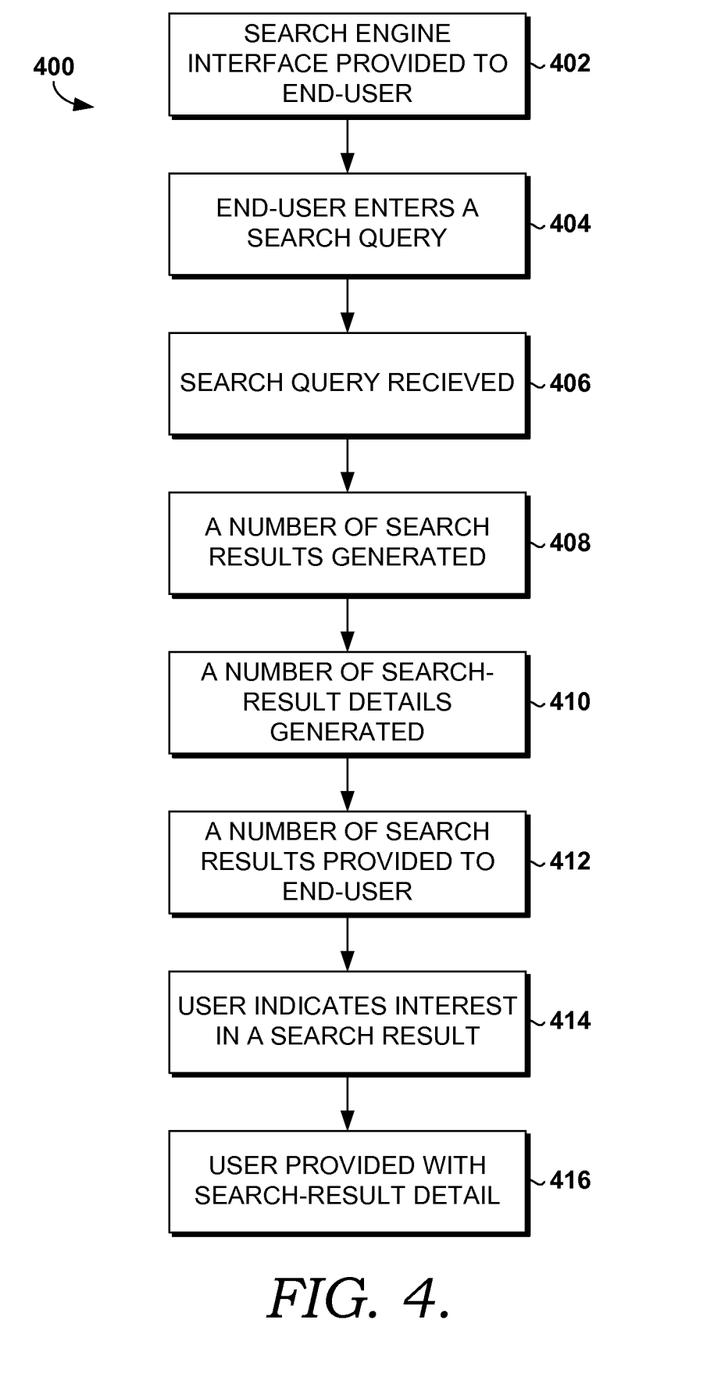
FIG. 4 is a flow diagram that illustrates a computer-implemented method for providing search results and associated search-result details to a user.

Referring now to FIG. 4, a flow diagram is provided that illustrates a computer-implemented method 400 for providing search results and associated search-result details to a user. Initially, as shown at block 402, a search engine interface is provided to the end-user. The end-user may be associated with a number of user-attributes. For example, the user may be associated with interest areas (certain sports, movies, chess, java script programming, Tokyo, travel, French translation, ancient history, etc), user-location information (the user is located in New York City, a mountain region, a Spanish speaking country, etc), media interests (AIFF files, flash animations, not WAV files, etc), the user's gender (male, female, unknown), age, political affiliation, etc. The search engine user interface allows the end-user to interact with the search engine to enter a search query. As shown at block 404, the end-user enters a search query. This search query is then received by a search engine, as illustrated at block 406. A number of search results are then generated based on the received search query as illustrated at block 408. Also, a number of search-result details are generated based on the search result query and the user-attributes associated with this particular end-user, as shown at block 410.

For instance, at block 404 the user may have entered as a search query "Madrid." The search engine may receive this query at block 406. A number of search results relating to "Madrid" can then be generated at block 408. This particular user may have as associated user-attributes that he or she is interested in both Soccer and video files. If any of the search results generated at block 408 contain either video files or are related to the Real Madrid soccer club (or both), the search engine may generate these search-result details along with the search result at block 410.

As shown at block 412, a number of search results are provided to the user for presentation. It should be noted that the search-result details associated with a particular search result may influence the ordering in which the search results are presented to the user. For example, a search result that has as an associated search-result attribute a video of the Real Madrid soccer club may be one of the first search results presented to the user. This search result may be presented along with an icon that notifies the user that there is a video file associated with that particular search result. The user indicates interest in one of the provided search results, as illustrated at block 414. As an example, the indication of interest may be that the user clicked on the icon that had notified the user of the existence of a video search-result detail relating to the Real Madrid Soccer Club. The user is then provided with an appropriate search result detail as shown at block 416. For example, if an indication of interest is received from the user in the example above, a video file relating to the Real Madrid Soccer Club, or a preview image of that video file, may be presented to the user. These search-result details may be presented in a pop-up, a slide-out, etc.

Figure 5:
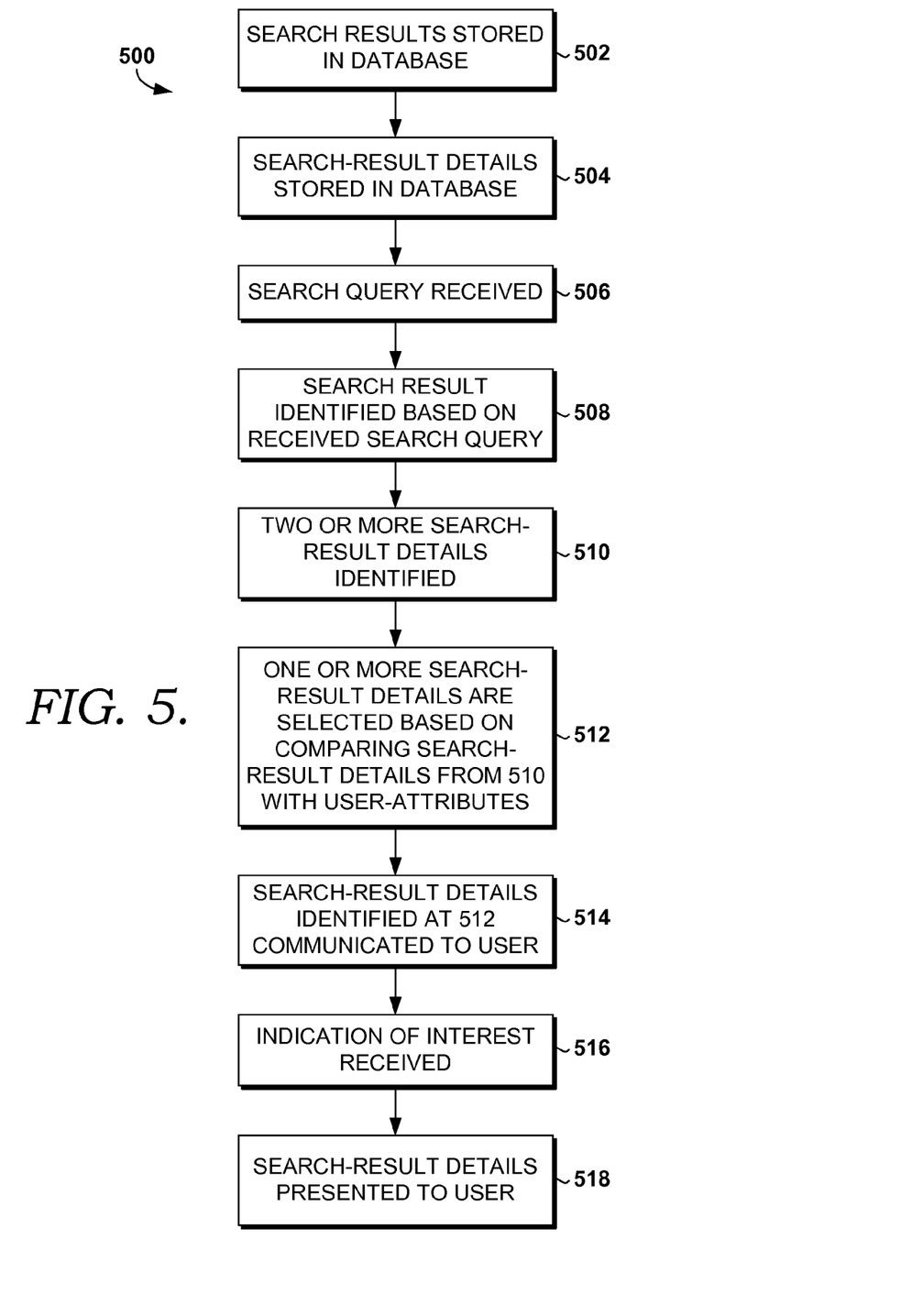
FIG. 5 is a flow diagram that illustrates a method for providing search-result details to a user.

Turning now to FIG. 5, a flow diagram is provided that illustrates a method 500 for providing search-result details to a user. This user is associated with a number of user-attributes. Again, as noted previously, these user-attributes may comprise location, phone number, hobbies, future travel plans, etc. As shown at block 502, search results are stored in a database. A number of search-result details are stored in a database as well, as illustrated at block 504. These search-result details may be gleaned from the computer documents referenced by the search results, and may include media files, computer documents linked to from the search result, location information (such as address, phone number, intersection, country, building, GPS data, etc). A number of these search-result details are associated with a particular search result. As shown at block 506, a search query is received at the search engine. In response to this received search query, as shown at block 508, a search result is identified based on the received search query. As illustrated at block 510, two or more search-result details are identified as being associated with the search result identified at block 508. As illustrated at block 512, one or more search-result details are selected from the two or more search result details identified at block 510 based on comparing the detail-attributes associated with each search-result detail and one or more user-attributes.

For example, a search query of "Madrid" may be received at the search engine at block 506. In response to this received search query, as shown at block 508, a search result may be identified that relates to "Madrid." Next, as illustrated at block 510, two or more search-result details may be identified as being associated with the search result identified at block 508. For example, the particular search result identified at block 508 may have as two search-result details associated with it: (1) an image file of the city of Madrid, and (2) an image file of the Real Madrid soccer team. The image file of the city of Madrid may be associated with a "location" detail-attribute, a "city in Europe" detail-attribute, and an "image file" detail-attribute, while the image file of the Real Madrid soccer team may be associated with a "soccer" detail-attribute and an "image file" detail-attribute. The user may have as a user-attribute that he or she is interested in soccer. The user may also have as a user-attribute that he or she is not interested in cities in Europe. Either or both of these user-attributes can be compared with the detail-attributes associated with the search-result details to identify that the image of the Real Madrid soccer club is the search-result detail most appropriate to present to this particular user. Thus, having two or more search-result details associated with each search-result allows for the search-result details to be tailored to a particular search engine user.

Search result identified at block 508 and any search-result details identified at block 512 are then communicated to the user, as shown at block 514. It should be noted that search results may be displayed while the search-result details may not be displayed until an indication of interest is received. For example, while both a search result and a search-result detail may be communicated to the user, the search result related to "Madrid" may be displayed, but search-result details identified at block 510, such as the image file of the Real Madrid soccer club, might not be presented yet. This could be accomplished by communicating the search-result detail to the user, but having, for example, JavaScript code that does not display then search-result detail to the user until the user clicks on a particular icon. It will be appreciated by one of ordinary skill in the art that there are a number of techniques to accomplish this and similar features. As shown in block 516, an indication of interest associated with the search result is received from the user. For example, the user may click on a thumbnail of the image of the Real Madrid soccer club associated with the search result. In response to this received indication of interest, as shown at block 518, search-result details identified at block 512 are presented to the user. For example, the image of the Real Madrid soccer club may be presented to the user in a popup box.

Figure 6:
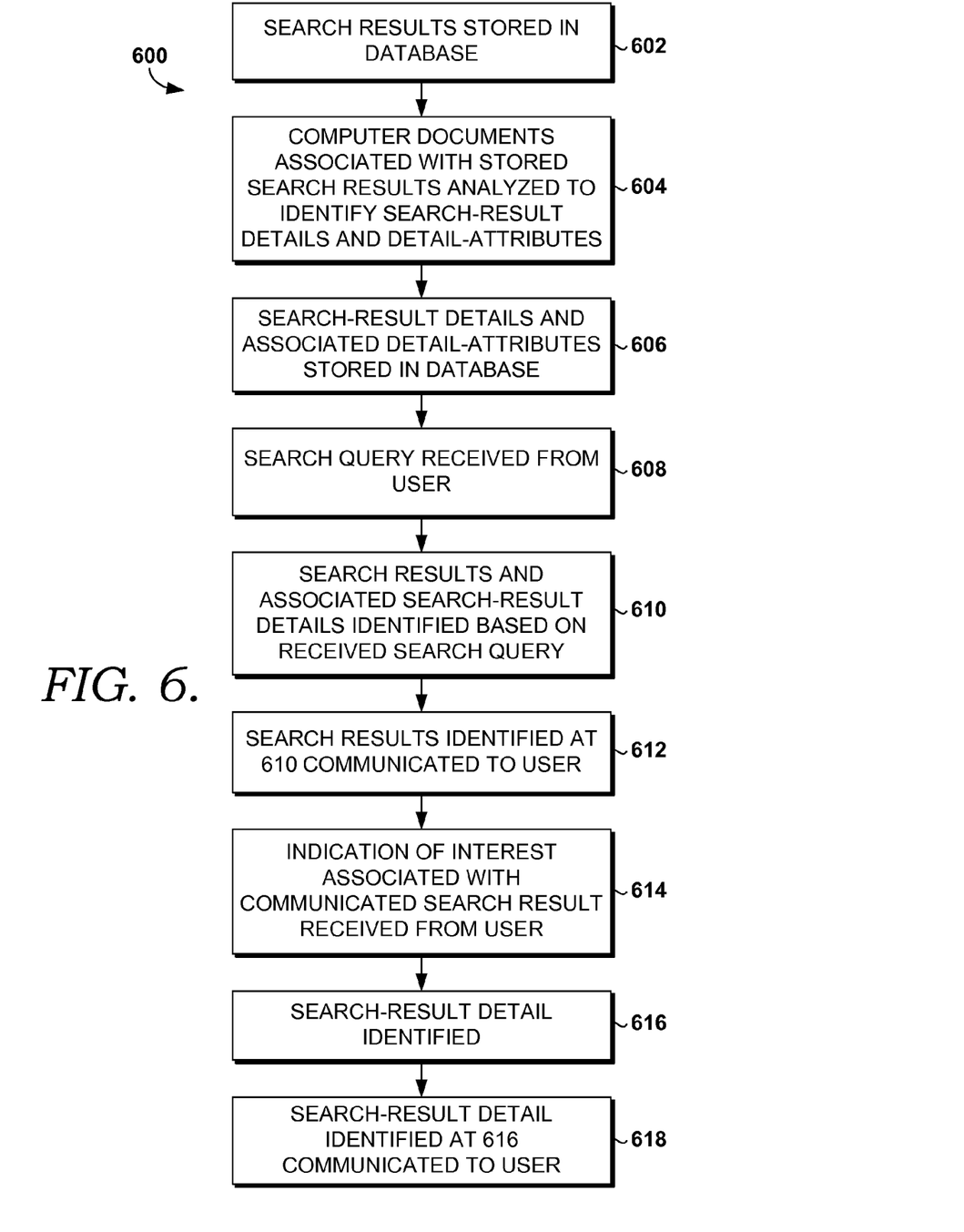
FIG. 6 is a flow diagram that illustrates a further method for providing search results and associated search-result details to a user.

With reference now to FIG. 6, a flow diagram is provided that illustrates a method 600 for providing search results and associated search-result details for a user. The user may be associated with a number of user-attributes. Again, as noted previously, these user-attributes may define user interests or determine what search-result details would be most appropriate for presentation to the user. As shown at block 602, search results are stored in a database. As shown at block 604, computer documents associated with the stored search results are analyzed to identify a number of search-result details and associated detail-attributes within the computer documents. For example, the computer documents may be analyzed to find media files that are contained within or linked to from the computer documents, other computer documents linked to from within the computer document, web pages that link to the indexed computer documents, categories of data (such as addresses, phone numbers, country names, celebrity names, etc), certain sentences or paragraphs, etc. Each of these search-result details may be associated with one or more detail-attributes that reflect the type of search-result detail that has been identified. For example, if the search-result detail "Argentina" is found within a document, this particular search-result detail may be associated with a detail-attribute "South American Country." Associating the search-result detail "Argentina" with the detail-attribute "South American Country" may help in later determining that the particular search-result detail would be of interest to an end-user. These detail-attributes may categorize various details into different categories, such as image files, video files, location information, phone numbers, names, addressees, people, animals, sports, etc.

As shown at block 606, the search-result details and associated detail-attributes are stored in a database. Storing these details and detail-attributes in a database may allow for efficient organization and later retrieval. As shown at block 608, a search query is then received from a user. For example, the search query "vacations" may be received at block 608. As shown at block 610, search results and any associated search-result details are identified based on the search query. For example, in response to the search query "vacation," a search result listing vacation destinations may be identified. Search results thus identified may then be communicated for presentation to the user, as shown at block 612. It should be noted that these search results may be sorted according to a number of factors when presented to the user, including keyword relevancy and a comparison of detail-attributes with user-attributes. As illustrated at block 614, an indication of interest associated with one of the communicated search results is received from the user. In response to this received indication of interest, a search-result detail is identified based on the search-result associated with the indication of interest and by comparing the user's associated user-attributes to the detail-attributes, as shown at block 616.

For example, in response to the search query "vacation" received at block 608, the search engine returns a search result at block 610 that lists vacation destinations. The user might wish to know more information relating to that particular search result, and so may hover his or her mouse over the search result to generate an indication of interest. This indication of interest is received by the search engine at block 614, and in response a search-result detail is identified. In this example, for instance, perhaps the user has as an associated detail-attribute that he or she is interested in South America. This information may have been determined because the user filled out a questionnaire asking about the user's interests, or perhaps because the user had previously conducted searches relating to South American countries. The search engine may then examine the search-result details associated with the vacation destinations search result. Upon comparing this user-attribute with the detail-attribute "South American Country" that was stored at block 606, the search-result detail "Argentina" may be provided for presentation to the user. Thus it is demonstrated how search-result details may be customized to a particular user.

Figure 7:
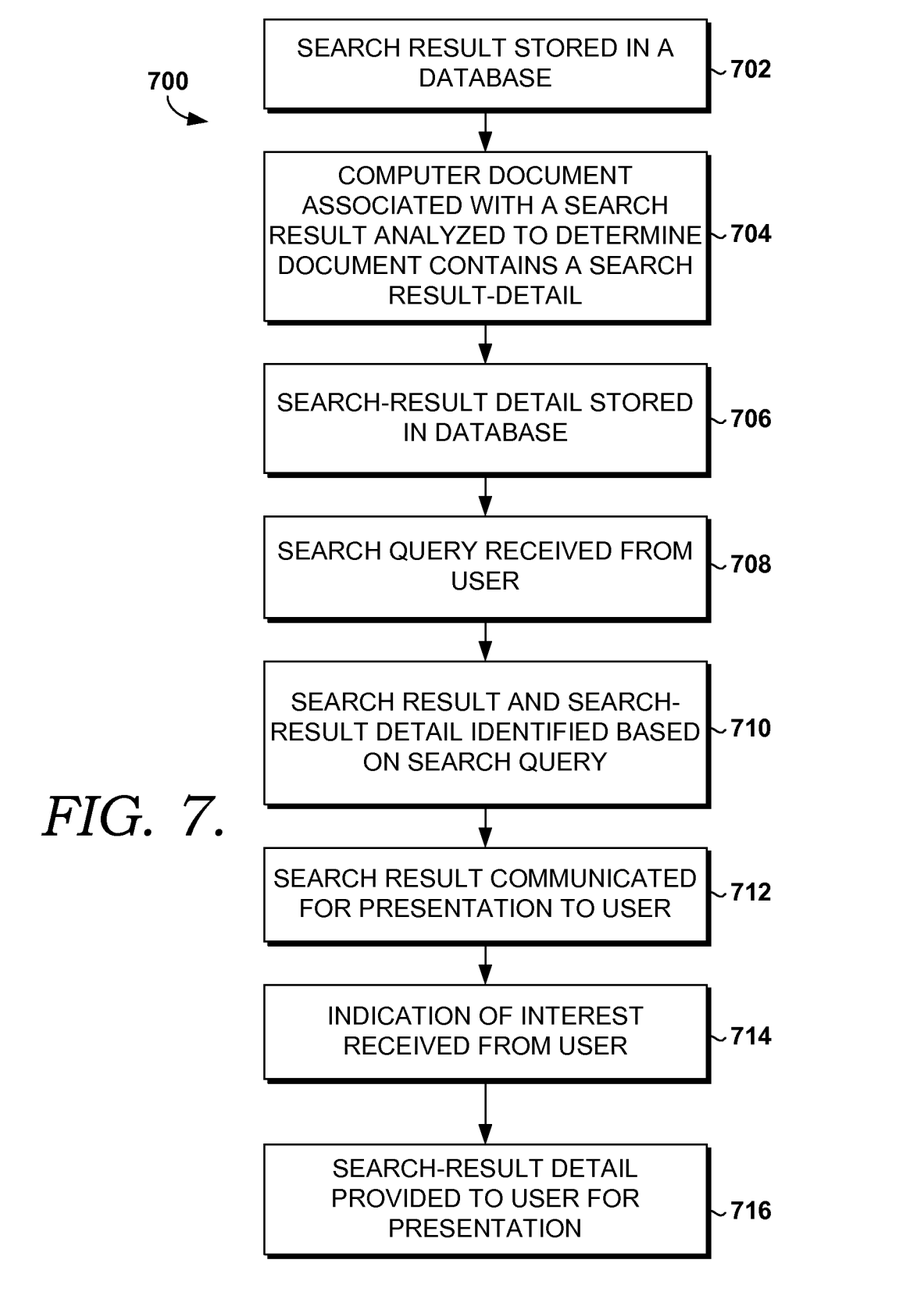
FIG. 7 is a flow diagram that illustrated a further method for providing search results and associated search-result details to a user.

Turning now to FIG. 7, a flow diagram is provided that illustrates a method for providing a search result and an associated search-result detail to a first user. At block 702, a search result is stored in a database. A computer document associated with the stored search result is analyzed, as illustrated at block 704, and it may be determined that the computer document contains or is associated with a search-result detail. If it is determined that the computer document contains or is associated with a search-result detail, the search-result detail is stored in a database, as shown at block 706. At block 708, a search query is received from a user. In response to the received search query, the search result and associated search-result detail that were stored at block 706 are identified, as illustrated at block 710. At block 712, the search result is communicated to the user. The user may then indicate his or her interest in the search result, and an indication of interest is then received at block 714. In response to this received indication of interest, the search-result detail identified at block 704 and stored at block 706 is provided to the user.

To further illustrate, a search result relating to a fast-food restaurant is be stored in a database at block 702. The web-site associated with this search result is analyzed at step 704, and it is determined that the web-site contains a search-result detail—specifically that the web-site contains the address of the restaurant. The web-site may contain multiple such search-result details, such as a picture of the restaurant, the phone-number of the restaurant, the menu of the restaurant, a link to a food-guide that has reviewed the restaurant, a theme song for the restaurant, a baseball team sponsored by the restaurant, a descriptive paragraph of the restaurant's history, etc. Any or all of these search-result details may be stored in a database at block 706.

At block 708, the name of the restaurant is received from the user as a search query. In response, the search result associated with the restaurant's web-site, along with the address search-result detail, is identified at block 710. The search result is then communicated to the user at block 712. The user may also be presented with an indicator, such as an icon, different colored text, etc, so the user may be aware that he or she may obtain a search-result detail upon generating an indication of interest. The user may then click on the icon, which generates an indication of interest that is received at block 714. In response to this indication of interest, the address search-result detail is presented to the user. The address may be presented in a number of ways, such as a popup, a slide-out, a new window, audibly, etc, as would be appreciated by one of ordinary skill in the art.

As can be understood, embodiments of the present invention provide search engine methods that allow for the presentation of search results and associated search-result details to an end-user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method for providing search results and associated search-result details to a user, the method comprising:
   receiving a search query from a user, the user being associated with at least one user-attribute;
   generating a plurality of search results in response to the search query, the plurality of search results comprising a first search result, wherein each of the plurality of search results are associated with one or more detail attributes;
   generating a first search-result detail for the first search result in response to the at least one user-attribute, the first search-result detail comprising additional information regarding the first search result, the first search result detail being determined based on analyzing the at least one user-attribute, wherein analyzing the at least one user user-attribute comprises comparing the at least one user-attribute to the one or more detail attributes for the first search result;
   providing a portion of the plurality of search results for presentation to the user, the portion including the first search result;
   receiving from the user a first indication of interest, the first indication of interest being associated with the first search result;
   providing the first search-result detail for the first search result for presentation to the user in response to the received first indication of interest according to a first manner of presentation, the first manner of presentation of the search-result detail being determined based on the user device and the received first indication of interest;
   providing an indication of availability of additional search result details associated with the first search result;
   receiving from the user a second indication of interest, the second indication of interest being associated with the first search result; and
   providing the second search result detail for presentation to the user in response to the received second indication of interest according to a second manner of presentation, the second manner of presentation of the second search-result detail being determined based on the user device and the received second indication of interest.

2. The computer-implemented method of claim 1, wherein the at least one user-attribute comprises user-location information.

3. The computer-implemented method of claim 1, wherein the at least one user-attribute comprises user search-history information.

4. The computer-implemented method of claim 1, wherein the at least one user-attribute comprises a user-interest.

5. The computer-implemented method of claim 1, wherein the at least one user-attribute comprises a type of user computing device.

6. The computer-implemented method of claim 1, wherein the search-result detail comprises location information.

7. The computer-implemented method of claim 1, wherein the search-result detail comprises a group of words extracted from the first search result.

8. The computer-implemented method of claim 1, wherein the manner in which the search-result detail is provided to the user for presentation is determined based on the received indication of interest.

9. One or more computer-storage device storing computer-useable instructions for causing a computing device to perform a method for providing search-result details to a user, the method comprising:
   storing a plurality of search results in a database;
   storing a plurality of search-result details in a database, each of the plurality of search-result details being associated with and comprising additional information regarding at least one of the plurality of search results, each of the plurality of search-result details being associated with at least one detail-attribute, at least one search result being associated with at least two of the plurality of search-result details;
   receiving a search query from a user, the user being associated with at least one user-attribute;
   identifying a portion of the plurality of search results based on the search query, the portion including the at least one search result;
   identifying the at least two of the plurality of search-result details associated with the at least one search result;
   identifying a first search result detail of the at least two search-result details based on comparing the at least one detail-attribute of each of the at least two search-result details with the at least one user-attribute;
   communicating the at least one search result for presentation to the user;
   communicating the first search-result detail to the user;
   receiving a first indication of interest from the user, the first indication of interest being associated with the at least one search result;
   facilitating presentation of the first search-result detail to the user in response to the received first indication of interest according to a first manner of presentation, wherein the first manner of presentation of the search-result detail is determined based on the user device and the received first indication of interest;
   providing an indication to the user of additional available search result details associated with the at least one search result;
   receiving a second indication of interest from the user, the second indication of interest being associated with the first search-result detail presented to the user;
   storing the second indication of interest in a database, wherein the second indication of interest is stored as a detail-attribute associated with the at least one search-result detail;
   receiving a third indication of interest from the user, the third indication of interest being associated with the at least one search result; and
   facilitating presentation of a second search-result detail to the user in response to the received third indication of interest according to a second manner of presentation, wherein the second manner of presentation of the second search-result detail is determined based on the user device and the received third indication of interest, wherein the second search result detail is identified based on comparing the at least one detail-attribute of each of the at least two search-result details with the at least one user-attribute.

10. The one or more computer-storage device of claim 9, wherein the at least one search-result detail comprises product price information.

11. The one or more computer-storage device of claim 9, wherein the user clicks in the vicinity of a search-result to generate the indication of interest.

12. The one or more computer-storage device of claim 9, wherein the indication of interest is stored in a database.

13. The one or more computer-storage device of claim 9, wherein the search-result details comprise web sites that link to the computer document associated with one of the plurality of search results.

14. One or more computer-storage device storing computer-useable instructions for causing a computing device to perform a method for providing a search result and an associated search-result detail to a first user, the method comprising:

storing a search result in a database;

analyzing a computer document associated with the search result to determine that the computer document contains at least one search-result detail, the at least one search-result detail comprising additional information regarding the search result, the at least one search-result detail associated with at least one detail attribute, wherein it is determined that the computer document contains at least one search-result detail by examining the type of data comprising portions of the computer document;

storing the at least one search-result detail in a database;

receiving a search query from the first user, the first user being associated with at least one user attribute;

identifying the search result and the at least one search-result detail based on the search query, wherein identifying the at least one search-result detail comprises comparing the at least one user attribute to the at least one detail attribute;

communicating the search result for presentation to the first user;

receiving an indication of interest from the first user, the indication of interest being associated with the search result;

providing the at least one search-result detail for presentation to the first user, the manner of presentation of the search-result detail being determined based on the user device and the received indication of interest; and providing an indication to the first user that additional search result details may be obtained for the search result.

* * * * *